No. 877,389. PATENTED JAN. 21, 1908.
W. E. WERD.
TONGS.
APPLICATION FILED MAR. 12, 1907.
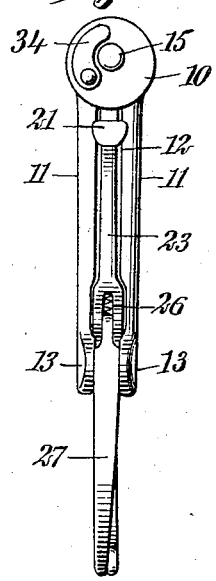
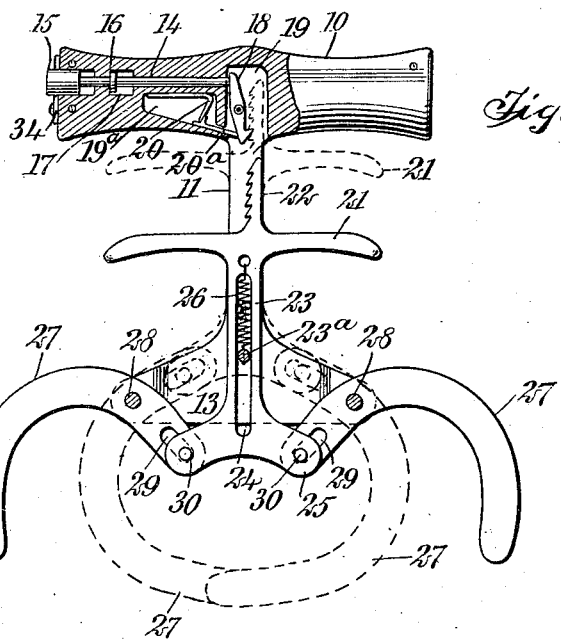
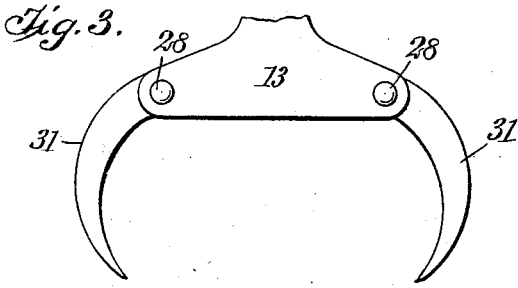
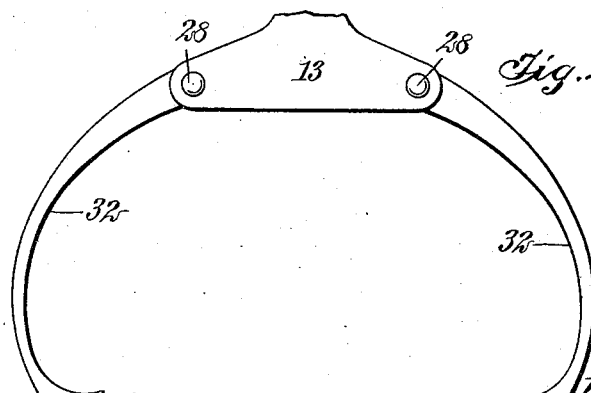
WITNESSES
INVENTOR
William E. Werd
BY Munn & Co
ATTORNEYS

UNITED STATES PATENT OFFICE.

WILLIAM E. WERD, OF DEER LODGE, MONTANA.

TONGS.

No. 877,389.  Specification of Letters Patent.  Patented Jan. 21, 1908.

Application filed March 12, 1907. Serial No. 361,931.

*To all whom it may concern:*

Be it known that I, WILLIAM E. WERD, a citizen of the United States, and a resident of Deer Lodge, in the county of Powell and State of Montana, have invented a new and useful Improvement in Tongs, of which the following is a full, clear, and exact description.

The purpose of the invention is to provide a tool handle adapted for use in connection with any type of gripping members, as for example, the confining members of handcuffs, the arms of ice tongs, the engaging arms of log dogs, etc.

It is a further purpose of the invention to provide simple and durable means for locking the gripping members in closed position and for expeditiously and conveniently separating them, and to so construct the handle that a firm grip can be maintained thereon, and wherein the more the handle is subjected to tension the greater will be the gripping action of the gripping members.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a sectional side elevation of the device showing the gripping members in closed and open positions and adapted to be used as a hand-cuff; Fig. 2 is an end view of the device illustrated in Fig. 1; Fig. 3 is a side elevation of the lower portion of the handle illustrating the gripping members as adapted for turning and handling logs; Fig. 4 is a view similar to that shown in Fig. 3, but illustrating the adaptation of the gripping members for gripping and handling ice.

The body of the device consists of a hand grip 10 which is in the nature of a handle and is provided with downwardly extending members 11 having a space 12 between them, which members 11 have enlargements 13 at their lower ends. In the handle member 10 a plunger 14 is adapted to slide, the head 15 whereof is at the outer end of the said handle member 10, and the said plunger 14 is also provided with a collar 16 that has movement in a small chamber 17 in the said handle member 10, limiting thereby the movement of the said plunger.

The inner end of the plunger is adapted to act upon a pawl 18 that is pivoted in a larger chamber 19 produced in the said handle member 10, as is shown in Fig. 1, and the said pawl 18 is held in working position by means of a spring 20, preferably of angular strapped formation, located in a chamber 19ª in said handle member 10, and a plunger 20ª is actuated by the said spring and has a bearing against the said pawl, but the above construction may be changed without departing from the spirit of the invention.

In addition to the body section just described, a gripping section is also employed. This gripping section consists of a finger piece 21 that is substantially parallel to the hand gripping member 10 of the body section, and from the finger gripping member 21 an upward extension 22 is provided, having teeth thereon adapted to be engaged by the said pawl 18 when the gripping section is carried up to the handle portion of the body section. A member 23 is carried downward from the finger grip 21, the said finger grip and its downwardly extending member being located within the space 12 between the members 11 of the body section, and the downwardly extending member 23 of the gripping section is provided with a slot 24, as is clearly shown in Fig. 1, and the said downwardly extending member 23 of the gripping section is provided with enlargements 25 at its lower end. A spring 26 is located in the slot or opening 24, being attached to the upper portion of the downwardly extending member 23, and to a pin or stud 23ª that passes through the slot 24 and is secured in the lower enlarged portions 13 of the body section of the device.

Gripping members 27 are employed in connection with the gripping section just described. These gripping members may be of any desired type. In Fig. 1 they are shown as curved and adapted when closed to overlap and encircle the wrist of a person, and constitute a hand-cuff. In placing these gripping members 27 they are pivoted by pins 28 between the enlargements 13 of the body section of the device, and each of said gripping members 27 at its inner end has a slot 29 produced therein, and pivot pins 30 are passed through these slots, the pivot pins being secured in the lower enlargements 25 of the gripping section of the device, as is clearly shown in full lines in Fig. 1.

When the gripping section of the device is drawn upward so that its finger grip 21 will be brought close to the hand grip 10 of the body section, as is shown in dotted lines in Fig. 1, the pawl 18 will engage with the ratchet teeth of the projection from the upper portion of the finger grip and will hold the gripping members 27 closed or in the position shown in dotted lines in Fig. 1. However, as soon as the plunger 14 is pressed inward to release the pawl 18 from the ratchet teeth of the extension 22, the spring 26 will act to carry the gripping section downward and cause the grippers 27 to separate, as is shown in full lines in said Fig. 1.

In Fig. 3 I have illustrated a slight departure in the formation of the grippers, wherein the grippers 31 are more or less pointed at their lower ends and are curved in direction of each other so that they may take hold of a log to turn the same or to drag the said log wherever it may be desired. The inner formation of the grippers 31 is identical with that shown in Fig. 1, as is also the inner formation of the grippers 32, shown in Fig. 4, wherein the grippers are adapted to hold cakes of ice and to that end are provided with claws 33 at their lower ends.

This device is exceedingly simple and is obviously adaptable for many purposes.

The device constructed as is shown in Fig. 3 can be used for example for rolling barrels, holding animals at a distance, holding trapped animals while removing them from cage to cage, or to grasp objects in sewers and like places, and the device shown in Fig. 3 is likewise adaptable for handling baled hay. It will be understood that the device may be made in any desired size and yet retain the same movement, governed by the opening and closing of the hand.

When it is desired to hold the pawl 18 out of engagement with the toothed extension 22, the plunger 14 is held in an inner position by means of a latch 34 at an end of the handle 10 engaging with the head 15 of the said plunger 14, at which time the gripping members 27 may be freely and instantly opened and closed at the will of the operator.

Having thus described my invention, I claim as new and desire to secure by Letters Patent,—

1. Tongs comprising a grip provided with downwardly extending spaced parallel members having lateral enlargements at their free ends, gripping members pivoted to the enlargements and provided at their inner ends with slots, a member slidable between the spaced parallel members, said slidable member having lateral projections provided with pins, the pins engaging the slots of the fingers, said slidable member having a toothed upward extension, and a finger grip adjacent to the extension, a spring pressed pawl pivoted in the grip for engaging the teeth of the extension, a plunger slidable in the grip and engaging the pawl, for releasing said pawl, said plunger having a head projecting beyond the grip, and a latch on the grip for engaging the head to retain the plunger in its inward position.

2. Tongs consisting of a body section comprising a hand grip and spaced members extending therefrom, a plunger located in the hand grip, a spring-controlled pawl operated upon by said plunger, a finger grip having slidable movement in the spaces between the downwardly extending members of the hand grip, a rack carried by said finger grip adapted for engagement by the said pawl, tensional means for drawing the finger grip outwardly when released from the said pawl, and gripping members pivotally connected with the hand grip section of the device and likewise pivotally connected with the finger grip section of the device.

3. In tongs the combination with a body section comprising a hand grip and spaced members extending therefrom having enlargements at their lower ends, a plunger located in the hand grip extending out beyond one end thereof, and spring-controlled, a pawl also located in the hand grip adapted to be operated by the said plunger, of a finger grip section mounted for movement between the spaced members of the body section and comprising finger pieces, a rack extending therefrom for engagement with the pawl, a spring adapted to carry the said finger grip section outward when released from the said pawl, and gripping members having slots at their inner ends and pivot pins carried by the said finger grip sections extending through the said slots, the said gripping members being pivotally connected with the enlarged portions of the body section of the device.

In testimony whereof I have signed my name to this specification in the presence of two subscribing witnesses.

WILLIAM E. WERD.

Witnesses:
JOE IMSENBERG,
J. S. KEERL.